United States Patent Office 3,169,094
Patented Feb. 9, 1965

3,169,094
METHOD OF PREPARING INTRAVENOUSLY INJECTABLE FAT EMULSIONS FREE FROM SIDE REACTIONS OR COMPLICATIONS
Arvid Johannes Wretlind, Tegnergatan 15, Stockholm, Sweden
No Drawing. Filed Aug. 22, 1961, Ser. No. 133,023
Claims priority, application Sweden, Aug. 26, 1960, 8,170/60
8 Claims. (Cl. 167—66)

In certain states of diseases the patient cannot take in the food in a normal way due to certain reasons. If a patient in a good nutrition state is kept away from administration of food for a couple of days this is of minor importance for the course of the disease. If, on the contrary, the starvation would last a longer period or if the patient already from the beginning is in a bad state of nutrition it will be necessary to try to bring about a parenteral nutrition as complete as possible. In order to completely make up for the normal food administration it is necessary to supply water, salts, vitamins, proteins, carbohydrates and fats. These substances must be administered in a quantity sufficient to satisfy the minimum demand of the different substances as well as the caloric demand.

Intravenous administration of water, salts, vitamins, proteins and carbohydrates can at present be effected without difficulties. On the other hand very great difficulties are present in satisfying the caloric demand completely by said substances. In using said conventional infusion solutions too large quantities of water have to be administered in order to satisfy the caloric demand. Another possibility to satisfy the caloric demand is to administer more concentrated solutions of proteins in the form of amino acids and carbohydrates. If such concentrated solutions or so called hypertonic solutions are used the frequency of untoward side reactions in the form of thrombophlebitis increases. A still further possibility is to add alcohol to the infusion solutions in order to increase the caloric value. In using said alcoholic solutions considerable inconvenience arises in connection with the pharmacologic effects of the alcohol.

In order to obtain a complete parenteral nutrition which at the same time covers the caloric demand, intensive research regarding the possibilities of intravenous administration of fat emulsions has been made. By using fat emulsions a great amount of calories can be supplied in a small volume of liquid. Those inconveniences which are connected with the hypertonic amino acid or carbohydrate solutions do not occur because a fat emulsion lacks osmotic pressure. Furthermore, the pharmacologic effects obtained from the alcoholic infusion liquids do not occur. Jamakawa, Sato and Nomura are the pioneers in the fat emulsion field. In the nineteen twenties they made a lot of experimental and clinic studies for intravenous administration of fat emulsions. After that time the problem has been taken up in many quarters, but until now without getting clinically useful fat emulsions.

In a fat emulsion for intravenous use all fat particles must be less than $4\mu$ in diameter, otherwise they will get stuck in the lung capillaries. A preferable particle size is $1\mu$ or less, which also increases the stability of the emulsion. In order to obtain a stable emulsion it is furthermore necessary to use stabilizing substances such as phosphatides, polypropylenepolyethyleneglycol, polyglycerolmonooleates and so on. As fats are most often used vegetable oils, such as cottonseed oil, coconut oil and olive oil. The emulsions hitherto studied have a percentage of fat of 5 to 50 in a 5 percent glucose solution. The contents of calories are thus 550 to 4600 calories per litre. The quantities which have been given intravenously to patients are, as a rule, between 50 to 200 g. of fat per day, corresponding to about 1 to 3 g. of fat per kg. of bodyweight.

Even if it has thus been proved that a fat emulsion can be injected or infused intravenously in man, the intravenous fat emulsions have not as yet got any extended use. The reason for this is that the fat emulsions now available have a high frequency of untoward side reactions. Said side reactions are of several kinds. The most usual and most innocent are feeling of heat or cold, headache, fatigue, light pressure over the breast; other side reactions are loin pain and urticaria. Of clinical importance are rises in the temperature in connection with chill. The frequency of side reactions is between 10 and 100% in the different series tested and published.

An immense number of fat emulsions have been produced in the past while searching for a fat emulsion without side reactions. Many and great demands must be made on a fat emulsion which is to be injected intravenously in man. First of all it must of course be free from side reactions. Furthermore, the fat must be without toxic effect. The emulsifier used must also be without detrimental influence. The ready fat emulsion must be such that the different fat particle do not cake together in the blood vessels or form aggregates. The fat emulsion must stand auto-claving. Furthermore, it is desirable that it endures freezing. Moreover, it is evident that the fat emulsion shall have such a composition and character that it can be stored for a long time without breaking or giving so-called cream-formation. A further demand which should be mentioned in this connection, is that the fat emulsions should have such a composition that they do not influence the blood-pressure and the circulation.

It has now appeared that by suitable selection of fat as well as of emulsifiers and solvents a fat emulsion can be produced which can be supplied to man without side reactions. This fat emulsion contains native, unsaturated vegetable fats stabilized with native egg phosphatides, said two substances having been produced in such a manner that when used clinically no side reactions occur.

The characteristic features of the present method are that soy bean oil produced by mild extraction with organic solvents, are emulsified with native egg phosphatides in an aqueous solution, preferably containing a water-soluble substance to obtain a suitable osmotic pressure, while adding surface-active agents, if desired, whereafter the mixture is homogenized to an emulsion with a particle size suitable for intravenous nutrition. The aqueous phase preferably contains glycerol, glucose, fructose or other carbohydrates to obtain a suitable osmotic pressure. The concentration of the fat is preferably between 5 and 50 percent by weight and of egg phosphatides in the emulsion between 0.05 and 3 percent by weight.

In order to produce a fat emulsion according to the present invention it is necessary to use a soy bean fat which has been obtained by extraction from soy beans in such a manner that the temperature does not rise above 100° C., but for short periods of time, and that oxidation phenomena are avoided by carrying out the extraction in a nitrogen gas or argon gas atmosphere, and that the fat emulsion is stored in dark and cold. In the same way it is necessary to use phosphatides which have been produced immediately before use and in similar manner it is necessary to avoid oxidation and other reactions. The extraction is made, e.g., with ethyl alcohol, ether or petroleum ether, e.g., at 10 to 30° C.

Examples for the production of the emulsions according to the invention will be given below. The characteristic feature of the invention is that such fat emulsions, free from side reactions or side effects, only can be produced by means of egg phosphatides. If corresponding tests are made with other phosphatides, e.g., soy bean phosphatides, untoward side reactions will occur. When carrying out the invention auxiliary emulsifiers or stabilizers such as polyethylenepolypropyleneglycol, polyglycerolmonooleate and other surface-active substances may be added. The reason for using such synthetic surface tension reducing agents is that certain physical properties of the fat emulsion thereby can be improved. On the other hand they have no importance for the absence of the side reactions. The aqueous phase of the fat emulsion may either consist of 5 percent glucose solution, 2.5 percent alcohol solution, 2.5 percent glycerol solution or other similar aqueous solutions. From many points of view the 2.5 percent glycerol solution seems to be most suitable.

The reason why it has not earlier been possible to use fat emulsions of this type is that various combinations of vegetable fats and phosphatides have not been systematically studied and that no efforts have been made to deal with newly-produced and mildly isolated fats, and phosphatides respectively. In all publications regarding intravenous fat emulsions, therefore, a lot of troublesome and serious side reactions have been mentioned in connection with cottonseed oil, soy bean oil, olive oil and coconut oil emulsions et al.

In the production of the emulsions according to the present method the various constituents are mixed intensively so that a coarse emulsion is obtained. This coarse emulsion is thereafter homogenized in a known manner until a particle size lying below $1\mu$ is obtained. A typical fat emulsion according to this invention may have the following composition: 10% of soy bean oil, 1.2% of purified egg phosphatides, 2.5% of glycerol and distilled water ad 100%. The concentration of the oil may vary from 5 to 50%.

The invention is illustrated more in detail by the following examples.

EXAMPLE 1

A. *Production of native egg phosphatides*

1 kg. of dried egg yoke powder is extracted two times with 3 litres of 96 percent alcohol and thereafter with 3 litres of acetone. The combined extracts are evaporated in vacuum under argon or nitrogen gas. The residue is dissolved in 500 ml. of petroleum ether, filtered and precipitated with 3 litres of acetone. The liquid is decanted from the precipitate. After dissolving in 500 ml. of petroleum ether the precipitation is repeated. The phosphatides are suspended under intense stirring in acetone whereafter the aqueous phase is decanted off. This is repeated 6 times. Thereafter the phosphatide precipitate is dissolved in the least possible quantity of petroleum ether and centrifuged so that a clear solution is obtained. This solution is precipitated with 6 volumes of acetone. The clear liquid is decanted off. The phosphatides obtained are stored under acetone and argon gas in the cold until they are used when they are dried in vacuum. Analysis of the phosphatides after drying: N 1.7 to 1.8%, P 3.3 to 3.4%. From 1 kg. of egg yoke powder 150 to 250 g. of phosphatides are obtained.

B. *Production of soy bean oil*

10 kg. of ground soy beans are extracted with 5 portions of 20 litres each of petroleum ether. The combined extracts are evaporated under nitrogen gas or argon gas. The oil thereby obtained is treated with 5 litres of water and 2 litres of 2.5 percent soda solution. After separation of the aqueous phase the oil is washed with distilled, pyrogen-free water until neutral reaction is obtained. By addition of anhydrous sodium sulphate the oil is dried and decolorized with 20 g. of active carbon and 200 g. of aluminium oxide. The precipitate obtained when the oil is stored at 0° C. is filtered off, whereafter the filtered oil may be directly used for the preparation of fat emulsion.

C. *Preparation of fat emulsion*

10 kg. of soy bean oil are mixed with 1.2 kg. of egg phosphatides, 5 kg. of glucose and 90 kg. of distilled and pyrogen-free water so that a coarse emulsion is obtained. After homogenization the emulsion is poured into infusion bottles of 1 litre and autoclaved in known manner so that possibly occurring bacteria and spores will be killed with certainty. Thereby clinically emulsions free from side reactions are obtained which can be used after approved pyrogen and sterility controls.

EXAMPLE 2

*Preparation of soy bean emulsion*

20 kg. of native and newly produced soy bean oil are mixed with 0.2 to 2.4 kg. of egg phosphatides, 2 to 5 kg. of glycerol and 80 kg. of distilled and pyrogen-free water. After emulsifying in known manner and autoclaving it is ready for clinical use after usual control tests.

EXAMPLE 3

Clinically useful fat emulsions may be produced in the following manner:

10 kg. of soy bean oil are mixed with 0.6 to 2.4 kg. of native egg phosphatides, 5 kg. of glucose, 0.05 to 0.6 kg. of surface tension reducing agents such as polyethylenepolypropyleneglycol, "Tween" (polyoxyalkylene derivatives of hexitol anhydride partial long-chain fatty acid esters), "Span" (long-chain fatty acid partial esters of hexitol anhydrides) or the like. After homogenization to a particle size less than $4\mu$, the emulsions are autoclaved and checked before clinical use.

What I claim is:

1. A method for the manufacture of intravenously injectable fat emulsions of vegetable oils and phosphatides free of undesirable side effects which comprises:
    (1) emulsifying an aqueous mixture containing (a) soybean oil which has been produced by extraction with organic solvents under conditions to avoid oxidation at a temperature not exceeding 100° C. and (b) egg phosphatides which have been produced by successive extractions with alcohol and acetone and thereafter purified by treatment with petroleum ether under conditions to avoid oxidation thereof, and
    (2) subsequently homogenizing said mixture to produce an aqueous emulsion having a particle size of less than about four microns.

2. A method according to claim 1 wherein the aqueous phase of the emulsion contains a substance selected from the group consisting of glycerol and carbohydrates.

3. A method according to claim 1 wherein the emulsification is conducted in the presence of a non-toxic surface-active agent.

4. A method for the manufacture of intravenously injectable fat emulsions of vegetable oils and phosphatides free of undesirable side effects which comprises:
    (1) emulsifying an aqueous mixture containing (a) about 5–50% by weight of the emulsion of soybean oil which has been produced by extraction with organic solvents under conditions to avoid oxidation at a temperature not exceeding 100° C. and (b) about 0.05–3% by weight of the emulsion of egg phosphatides which have been produced by successive extractions with alcohol and acetone and thereafter purified by treatment with petroleum ether under conditions to avoid oxidation thereof and,
    (2) subsequently homogenizing to produce an aqueous emulsion having a particle size of less than about four microns.

5. An intravenously injectable fat emulsion free of undesirable side effects comprising an aqueous mixture of (a) soybean oil which has been produced by extraction with organic solvents under conditions to avoid oxidation at a temperature not exceeding 100° C. and (b) egg phosphatides which have been produced by successive extractions with alcohol and acetone and thereafter purified by treatment with petroleum ether under conditions to avoid oxidation thereof, said emulsion having a particle size of less than about four microns.

6. A composition according to claim 5 wherein the aqueous phase of the emulsion contains a substance selected from the group consisting of glycerol and carbohydrates.

7. A composition according to claim 5 wherein the emulsion contains a non-toxic surface-active agent.

8. An intravenously injectable fat emulsion free of undesirable side effects comprising an aqueous mixture of (a) about 5–50% by weight of the emulsion of soybean oil which has been produced by extraction with organic solvents under conditions to avoid oxidation at a temperature not exceeding 100° C. and (b) about 0.05–3% by weight of the emulsion of egg phosphatides which have been produced by successive extractions with alcohol and acetone and thereafter purified by treatment with petroleum ether under conditions to avoid oxidation thereof, said emulsion having a particle size of less than about four microns.

References Cited by the Examiner
UNITED STATES PATENTS
2,945,869  7/60  Meyer et al. _____ 167—66

FOREIGN PATENTS
828,312  2/60  Great Britain.

OTHER REFERENCES
Becker et al.: Jour. Lab. and Clin. Med., May 1954, 43:5 (page 752).

Hanahan et al.: Jour. of Biolog. Chem., vol. 192, 1951, pages 623–628.

LEWIS GOTTS, *Primary Examiner.*

M. O. WOLK, *Examiner.*